UNITED STATES PATENT OFFICE.

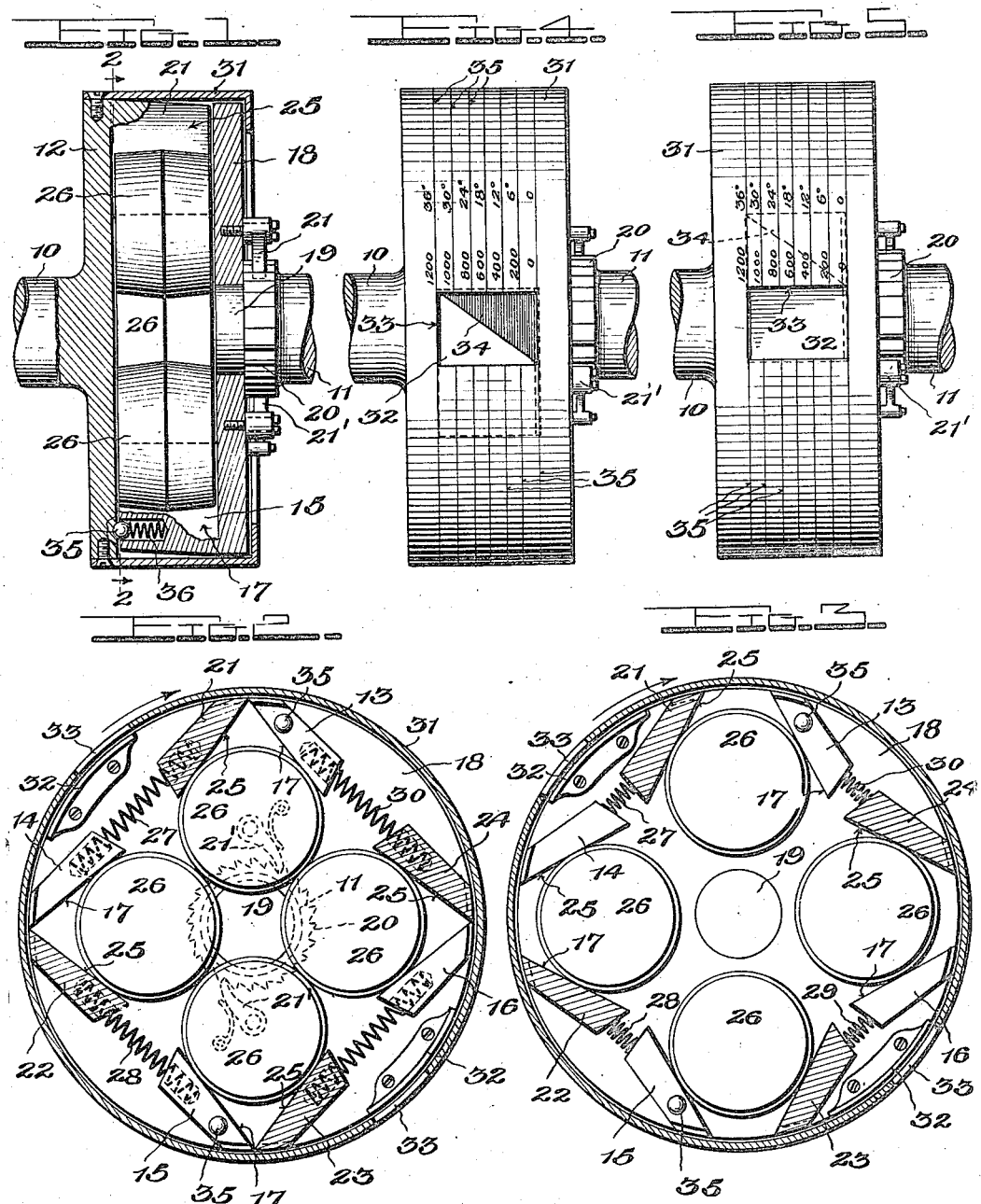

EDWARD C. NEWTON, OF MARYSVILLE, CALIFORNIA, ASSIGNOR TO AUTOMATIC SPARK ADVANCE CO., OF SAN FRANCISCO, CALIFORNIA, A CORPORATION OF CALIFORNIA.

AUTOMATIC ADVANCING AND SPEED-INDICATING COUPLING.

1,209,323.

Specification of Letters Patent.  Patented Dec. 19, 1916.

Application filed August 9, 1915.   Serial No. 44,543.

*To all whom it may concern:*

Be it known that I, EDWARD C. NEWTON, a citizen of the United States, and resident of Marysville, county of Yuba, State of California, have invented certain new and useful Improvements in Automatic Advancing and Speed-Indicating Couplings, of which the following is a specification.

This invention relates to shaft couplings and has for its object the provision of a coupling adapted to automatically vary the angular relation of the driving and driven members in accordance with speed variations, and having means for indicating the angular relation of the driving and driven members while the coupling is in rotation. This indicating means may also be utilized for showing the speed of rotation of the coupling.

Other uses of the device and the features of novelty will be apparent from the following description taken in connection with the accompanying drawings in which:—

Figure 1 is a longitudinal section through a coupling embodying my invention; Fig. 2 is a section on the line 2—2 of Fig. 1, the parts being shown in the position which they assume when the coupling is not rotating; Fig. 3 is a view similar to Fig. 2, but showing one position of the parts when rotating; Fig. 4 is a side elevation of the coupling with the parts in the position shown in Fig. 3; Fig. 5 is a view similar to Fig. 4 with the parts in the position shown in Fig. 2.

Referring to the drawings, 10 indicates a driving shaft and 11 a driven shaft. The driving shaft 10 carries a disk 12 having a series of axial extensions 21, 22, 23 and 24 on one side thereof, these extensions being preferably arranged in a symmetrical manner and each having a surface 25 arranged substantially as indicated. The driven shaft 11 carries a disk 18 which is preferably journaled thereon at 19, but which, for certain purposes may be rigidly connected therewith. When the disk 18 is journaled on the shaft 11 it is connected with the latter by means of a ratchet 20 and one or more pawls 21' so that the shaft and disk may have relative rotation in one direction, but are so connected as to be held against relative rotation in the opposite direction. The disk 18 has axial extensions 13, 14, 15 and 16 preferably similar to the extensions 21, 22, 23 and 24 and symmetrically placed with reference to the latter to form pairs of coöperating extensions as clearly shown in Figs. 2 and 3. The extensions 13, 14, 15 and 16 have surfaces 17 opposing the surfaces 25 and in angular relation to the latter so as to form substantially V-shaped spaces between the coöperating extensions as clearly shown in Fig. 2. Arranged between each pair of coöperating extensions and in engagement with the surfaces 17 and 25 thereof are the centrifugal elements 26, preferably of cylindrical or spherical form so as to be of circular cross-section.

With the parts as shown in Fig. 2 it will be seen that the centrifugal elements or disks 26 form an operative connection between the coöperating extensions and transmit power from the disk 12 to the disk 18. The normal direction of the rotation of the parts is indicated by arrows in Figs. 2 and 3 and from these figures it will be evident that, as the speed of rotation increases from zero the centrifugal elements 26 will be moved outwardly in a radial direction and separate the extensions with which they coöperate and thus produce a relative angular movement between the disks 12 and 18. From the position of the centrifugal elements 26 shown in Fig. 3 it will be evident that the coöperating extensions of the disks 12 and 18 have been widely separated. In order to restore the parts to the position shown in Fig. 2, when the speed of rotation is reduced, a suitable spring 27 is arranged between the extensions 14 and 21 and similar springs 28, 29 and 30 are arranged between the other extensions in the manner shown in Figs. 2 and 3.

It will be evident from Figs. 2 and 3 that, with a constant force transmitted between the driving and driven parts of the coupling, the angular relation of the disks 12 and 18 will be in accordance with the speed of rotation because the position of the centrifugal elements 26 varies with the speed of rotation. It is therefore possible to utilize this change in the angular relation of the disks 12 and 18 to indicate the speed and the amount of advance of the driven member of the coupling and for this purpose the disk 12 is provided with an axially extending flange 31 which incloses the extensions of the disks and also surrounds a plate 32 on the disk 18. The flange 31 is provided with one or more openings or windows 33 and the flange 32 is provided with one or more triangular spots or markings 34, preferably of red or other vivid color, and coöperating with said openings, these markings being concealed by the flange 31 when the parts are in the position shown in Fig. 2 and Fig. 5. As the disks 12 and 18 are rotated relatively by the centrifugal elements 26 the markings 34 appear through the openings 33 and the absolute rotation of the parts causes the markings to appear as a band of red or other color on the flange 31, the width of the band being dependent upon the amount of the markings which appears through the openings 33 and this amount will vary in accordance with the position of the centrifugal elements 26 so that when these elements are in their limiting position the markings 34 will fully appear through the openings 33.

In order to show the speed and angular advance of the driven member the flange 34 may have a series of lines 35 on the surface thereof to show the various widths of the band of color produced by the markings 34. These lines may be so arranged as to coöperate with a stationary index to indicate the degrees of angular advance and the different speeds.

Under certain conditions it may be desirable to have the driving and driven members locked together at low speeds and for this purpose the balls 35 may be provided, these balls being carried by extensions on the driven member and being pressed into suitable recesses in the driver by springs 36. It will be evident that the balls 35 will be forced out of the recesses when the speed of rotation increases enough to produce the necessary centrifugal force in the members 26.

When the speed indicating device is used, it is obvious that the load on the coupling must be substantially uniform.

It will be evident that changes may be made in the details of construction of the device, without departing from the spirit of the invention as defined in the claims, and I therefore do not wish to be limited to the exact details which I have shown and described.

Having thus described my invention what I claim is:—

1. In a device of the class described, the combination of a driving member having one or more axial extensions, a driven member having axial extensions coöperating with those on the driving member, said extensions having opposing faces normally arranged in angular relation to each other, and centrifugal elements of circular cross-section engaging each pair of said opposing faces and adapted to vary the angular relation of said members by changes in position and means continually acting to resist outward movement of the centrifugal elements.

2. In a device of the class described, the combination of a driving disk having axial extensions, a driven disk provided with axial extensions arranged to form pairs with the extensions on the driving disk, the opposite faces of the extensions forming each pair being arranged in angular relation, and centrifugal elements of circular cross-section arranged between each pair of said extensions and engaging the said faces thereof and adapted to vary the angular relation of said disks by separating said extensions by radial movement and means continually acting to resist outward movement of the centrifugal elements.

3. In a device of the class described, the combination of a driving disk having one or more axial extensions, a driven disk arranged alongside of the driving disk in axial alinement therewith and provided with axial extensions coöperating with the extensions on the driving disk, centrifugal elements of circular cross-section coöperating with said extensions and adapted to vary the angular relation of the disks by the separation of said axial extensions, springs for opposing the separation of said axial extensions, and latching means for forming a positive connection between said disks when at rest.

4. In a device of the class described, the combination of a driving disk, a driven shaft, an intermediate disk, a ratchet and pawl forming a connection between said intermediate disk and said driven shaft whereby relative movement therebetween in one direction is permitted, and centrifugal disks arranged between said driving and intermediate disks and coöperating with parts on the driving and intermediate disks to vary the angular relation thereof.

5. In a device of the class described the combination of a driving member having a projection, a driven member having a projection, said projections having opposed faces, a centrifugal element interposed between said faces and arranged to separate the projections as it moves outward under the influence of centrifugal force and yielding means for forcing the projections toward each other to thereby resist outward movement of the centrifugal element.

6. In a device of the class described, the combination of a driving member having a projection, a driven member having a projection, said projections having opposed faces and each having a seat for a spring, a centrifugal element interposed between said faces and arranged to separate the projections as it moves outward under the influence of centrifugal force and spring means for forcing the projections toward each other to thereby resist outward movement of the centrifugal element and including coil springs one arranged in each of said seats.

In testimony whereof I affix my signature.

EDWARD C. NEWTON.

Witnesses:
GRACE BOTTLER,
H. D. EICH.